(12) United States Patent
Matsumoto (10) Patent No.: US 10,150,240 B2
(45) Date of Patent: Dec. 11, 2018

(54) SWEEPER ROLLER, PLASTIC FILM MANUFACTURING DEVICE THAT USES SAME, AND MANUFACTURING METHOD

(71) Applicant: TORAY INDUSTRIES, INC., Tokyo (JP)

(72) Inventor: Tadashi Matsumoto, Otsu (JP)

(73) Assignee: TORAY INDUSTRIES, INC, Tokyo (JP)

( * ) Notice: Subject to any disclaimer, the term of this patent is extended or adjusted under 35 U.S.C. 154(b) by 504 days.

(21) Appl. No.: 14/779,761

(22) PCT Filed: Mar. 18, 2014

(86) PCT No.: PCT/JP2014/057253
§ 371 (c)(1),
(2) Date: Sep. 24, 2015

(87) PCT Pub. No.: WO2014/156807
PCT Pub. Date: Oct. 2, 2014

(65) Prior Publication Data
US 2016/0082643 A1 Mar. 24, 2016

(30) Foreign Application Priority Data
Mar. 27, 2013 (JP) .................. 2013-065484

(51) Int. Cl.
*B29C 47/88* (2006.01)
*B29C 47/00* (2006.01)
*B29C 43/22* (2006.01)
*B29C 43/46* (2006.01)
*B29C 43/24* (2006.01)

(52) U.S. Cl.
CPC .......... *B29C 47/884* (2013.01); *B29C 43/222* (2013.01); *B29C 47/004* (2013.01);
(Continued)

(58) Field of Classification Search
CPC ....... B29C 43/222; B29C 43/24; B29C 43/46; B29C 2043/461; B29C 47/004; B29C 47/88; B29C 47/884; B29C 47/886
(Continued)

(56) References Cited

U.S. PATENT DOCUMENTS 2,309,585 A * 1/1943 Haddock ................... C23C 2/00
110/101 R
4,104,772 A * 8/1978 Sailas ................... B23P 11/025
492/35
(Continued)

FOREIGN PATENT DOCUMENTS

JP 39021127 9/1964
JP 50152159 12/1975
(Continued)

OTHER PUBLICATIONS

International Search Report for International Application No. PCT/JP2014/057253 dated Jun. 24, 2014.

*Primary Examiner* — James P Mackey
(74) *Attorney, Agent, or Firm* — RatnerPrestia (57) ABSTRACT

A sweeper roller is provided for forming a film, the sweeper roller having helical grooves provided to the surface, wherein the ratio of the surface area of the helical groove portion is 30% or less of the surface area of the sweeper roller, and the width of the helical grooves in the axial direction of the sweeper roller is 25 mm or greater. Provided thereby are: a sweeper roller that does not generate air banks and sweeper marks during high-speed casting and when forming a thick film; a plastic film manufacturing device that uses the sweeper roller; and a manufacturing method.

5 Claims, 6 Drawing Sheets (52) U.S. Cl.
CPC ...... *B29C 47/0021* (2013.01); *B29C 47/0069* (2013.01); *B29C 47/88* (2013.01); *B29C 43/24* (2013.01); *B29C 43/46* (2013.01); *B29C 47/886* (2013.01); *B29C 47/887* (2013.01); *B29C 47/8845* (2013.01); *B29C 47/8865* (2013.01); *B29C 2043/461* (2013.01)

(58) Field of Classification Search
USPC .......................................................... 492/35
See application file for complete search history.

(56) References Cited

U.S. PATENT DOCUMENTS

| | | | | |
|---|---|---|---|---|
| 5,071,083 | A | * | 12/1991 | Tubota .................. B65H 18/16 226/193 |
| 5,199,168 | A | * | 4/1993 | Daly ........................ G01P 3/54 29/895.3 |
| 5,222,434 | A | * | 6/1993 | Smith ..................... B41F 31/26 101/348 |
| 6,508,750 | B1 | * | 1/2003 | Poorman ............. G11B 15/605 29/895.3 |
| 2012/0318443 | A1 | | 12/2012 | Iyanagi |

FOREIGN PATENT DOCUMENTS

| | | | |
|---|---|---|---|
| JP | 05056427 | | 7/1993 |
| JP | 6-136680 | * | 5/1994 |
| JP | 07017531 | | 3/1995 |
| JP | 09001623 | | 1/1997 |
| JP | 10058630 | | 3/1998 |
| JP | 2000355055 | | 12/2000 |
| JP | 2004188623 | | 7/2004 |
| JP | 2006130702 | | 5/2006 |
| JP | 2011161656 | | 8/2011 |

* cited by examiner

SWEEPER ROLLER, PLASTIC FILM MANUFACTURING DEVICE THAT USES SAME, AND MANUFACTURING METHOD

CROSS-REFERENCE TO RELATED APPLICATIONS

This is the U.S. National Phase application of PCT International Application No. PCT/JP2014/057253, filed Mar. 18, 2014, and claims priority to Japanese Patent Application No. 2013-065484, filed Mar. 27, 2013, the disclosures of each of these applications being incorporated herein by reference in their entireties for all purposes.

FIELD OF THE INVENTION

The present invention relates to a sweeper roller, and a plastic film manufacturing device and manufacturing method based thereon.

BACKGROUND OF THE INVENTION

Major methods widely used to produce a plastic film (hereinafter referred to simply as a film) from the melt include a step for discharging a molten resin continuously and bringing it into contact with a cooling roller to achieve its cooling and solidification (hereinafter referred to as casting step) to provide a web-like plastic film. In some of them, the casting step, for example, is not followed by a step for stretching the film in the flow direction (hereinafter referred to as stretching step) in order to produce film that is not stretched (hereinafter referred to as unstretched film). In such cases, the product manufacturing speed is equal to the speed of the cooling roller and accordingly, there are particularly strong demands for high-speed rollers that can ensure improved productivity.

In the casting step, on the other hand, components, such as low molecular weight polymers and monomers including oligomers and additives, are volatilized from the molten resin and then cooled and solidified on the cooling roller, leading to gradual contamination of the surface of the cooling roller. As the surface of the cooling roller is contaminated, the molten resin may fail to be cooled sufficiently, causing troubles such as deterioration in appearance quality and physical properties, or accumulated contaminants may come off and adhere to the film. If the casting step is accelerated, it is naturally expected that the discharge rate of the molten resin will increase and accordingly larger amounts of the volatile components will be volatilized, making the above troubles more serious. Consequently, frequent cleaning of the cooling roller will be required and it will become difficult to continue the film production process for a long period of time.

To solve this problem, it has been proposed that the molten resin in contact with the cooling roller or the film cooled and solidified be pressed between the cooling roller and a press roller having a grooved surface so that contaminants on the cooling roller are removed continuously by the film as they are generated, thus achieving continuous cleaning of the cooling roller. (Patent document 1 for example) Such a press roller is generally referred to as a sweeper roller and accordingly also called so hereinafter.

When the molten resin and the cooling roller come into contact with each other, the move of the air caught between the molten resin and the cooling roller is arrested at the contact point between them to form air pockets (hereinafter referred to as air banks) that can cause creasing and breakage of the film. To prevent this from occurring, the grooves in the surface of the sweeper roller are designed to facilitate the leak of air.

However, when a conventional sweeper roller as proposed in Patent document 1 is used, air banks may be formed if the casting rate in the casting step is too high or if the layer of the molten resin is too thick. If the proportion of the grooves to the surface area of the sweeper roller is increased in an attempt to prevent the formation of air banks, furthermore, the shapes of the grooves in the sweeper roller are transferred strongly to the film, leading to defects called sweeper marks.

PATENT DOCUMENTS

Patent document 1: Japanese Examined Patent Publication (Kokoku) No. SHO 39-21127

SUMMARY OF THE INVENTION

An object of the present invention is to provide a sweeper roller that is free of the formation of air banks and sweeper marks during high-speed casting or thick film production and also to provide a plastic film production apparatus and a production method that use the sweeper roller.

To meet the object, the present invention includes providing a sweeper roller for film production having a spirally grooved surface in which the proportion of the area of the spirally grooved parts to the surface area of the sweeper roller is 30% or less and the width of the spiral grooves measured in the axis direction of the sweeper roller is 25 mm or more.

According to a preferred embodiment, the present invention provides a sweeper roller for film production as described above in which the spiral grooves in the sweeper roller surface are aligned at intervals of 100 mm or less measured in the rotation direction of the sweeper roller.

According to another preferred embodiment, the present invention provides a sweeper roller for film production as described above in which the spiral grooves are aligned at an angle of 40° or more and less than 90° to the rotation direction of the sweeper roller.

According to another preferred embodiment, the present invention provides a sweeper roller for film production as described above in which the surface of the sweeper roller has a plurality of spiral grooves that do not cross each other.

According to still another preferred embodiment, the present invention provides a plastic film production apparatus that includes a T-die, a cooling roller, and a sweeper roller, in which the sweeper roller is the sweeper roller for film production as described above.

According to still another preferred embodiment, the present invention provides a plastic film production apparatus as described above, in which the surface of the sweeper roller has a plurality of spiral grooves aligned at regular intervals and the distance M expressed by equation (1) through which the spiral grooves existing in the surface of the sweeper roller move in the axis direction relative to the cooling roller as the cooling roller makes one revolution is not less than the width of the spiral grooves in the axis direction of the sweeper roller and not more than the width of the ungrooved parts in the axis direction of the sweeper roller.

$$M=\{(Dc \times N) \bmod Ds\}/Ds \times Pc \qquad \text{equation (1)}$$

where M: distance through which the grooves move in the axis direction as the cooling roller makes one revolution, Dc: outside diameter of the cooling roller,
Ds: outside diameter of the sweeper roller,
N: number of spiral grooves on the sweeper roller,
Pc: pitch of the spiral grooves in the axis direction, equal to L/N,
L: lead of the spiral grooves.

In addition, a still another preferred embodiment of the present invention provides a plastic film production method that includes the steps of discharging a molten resin from a T-die and bringing the molten resin into contact with a cooling roller so that it is cooled and solidified to form plastic film, in which the molten resin or the cooled and solidified plastic film is brought into contact with a sweeper roller during the period when the molten resin and the cooling roller are in contact with each other, and in which the sweeper roller used is the sweeper roller for film production as described above.

According to still another preferred embodiment, the present invention provides a plastic film production method as described above, in which the surface of the sweeper roller has a plurality of spiral grooves aligned at regular intervals and the distance M expressed by equation (1) through which the spiral grooves existing in the surface of the sweeper roller move in the axis direction relative to the cooling roller as the cooling roller makes one revolution is not less than the width of the spiral grooves measured in the axis direction of the sweeper roller and not more than the width of the ungrooved parts measured in the axis direction of the sweeper roller.

In an embodiment of the present invention, a sweeper roller for a film production is a roller that is in contact with a molten resin or a film during the period when the molten resin and the cooling roller are in contact with each other in the plastic film production method that includes the steps of discharging a molten resin from a T-die and bringing the molten resin into contact with a cooling roller so that it is cooled and solidified to form a plastic film.

In the present invention, furthermore, the proportion of the area of the spirally grooved parts to the surface area of the sweeper roller means the proportion of the area of the grooved parts to the surface area of the roller only in such a surface region that contains grooves when examined along the axis direction of the sweeper roller and if, for example, a groove-free region exists at an axis-directional edge, the area of that region is not included in the above surface area of the sweeper roller. The area of the spirally grooved parts means the area that they occupy in the surface of the sweeper roller and the shape (rectangular, V-shape, etc.) of the spiral grooves seen in the radius direction of the sweeper roller is not taken into consideration. For example, in the case where the grooves are aligned substantially in parallel and at regular intervals as illustrated in the development view of the surface of a sweeper roller in FIG. 4 except the axis-direction central region of the sweeper roller, the proportion of the area of the spirally grooved parts to the surface of the sweeper roller can be calculated as follows: the machining width of grooves B/the machining pitch of grooves P×100 (%). In the case where grooves cross each other or they are provided at irregular intervals as in the axis-direction central region of the sweeper roller in the development view of a sweeper roller surface shown in FIG. 4, it can be calculated as the proportion of the length of the grooved parts measured in the rotation direction of the sweeper roller to the circumference of the surface of the sweeper roller. In the present invention, the proportion of the area of the spirally grooved parts to the surface of the sweeper roller should be determined by taking measurements of the proportion at least at five points on the surface of the sweeper roller and averaging them.

Figure 4:
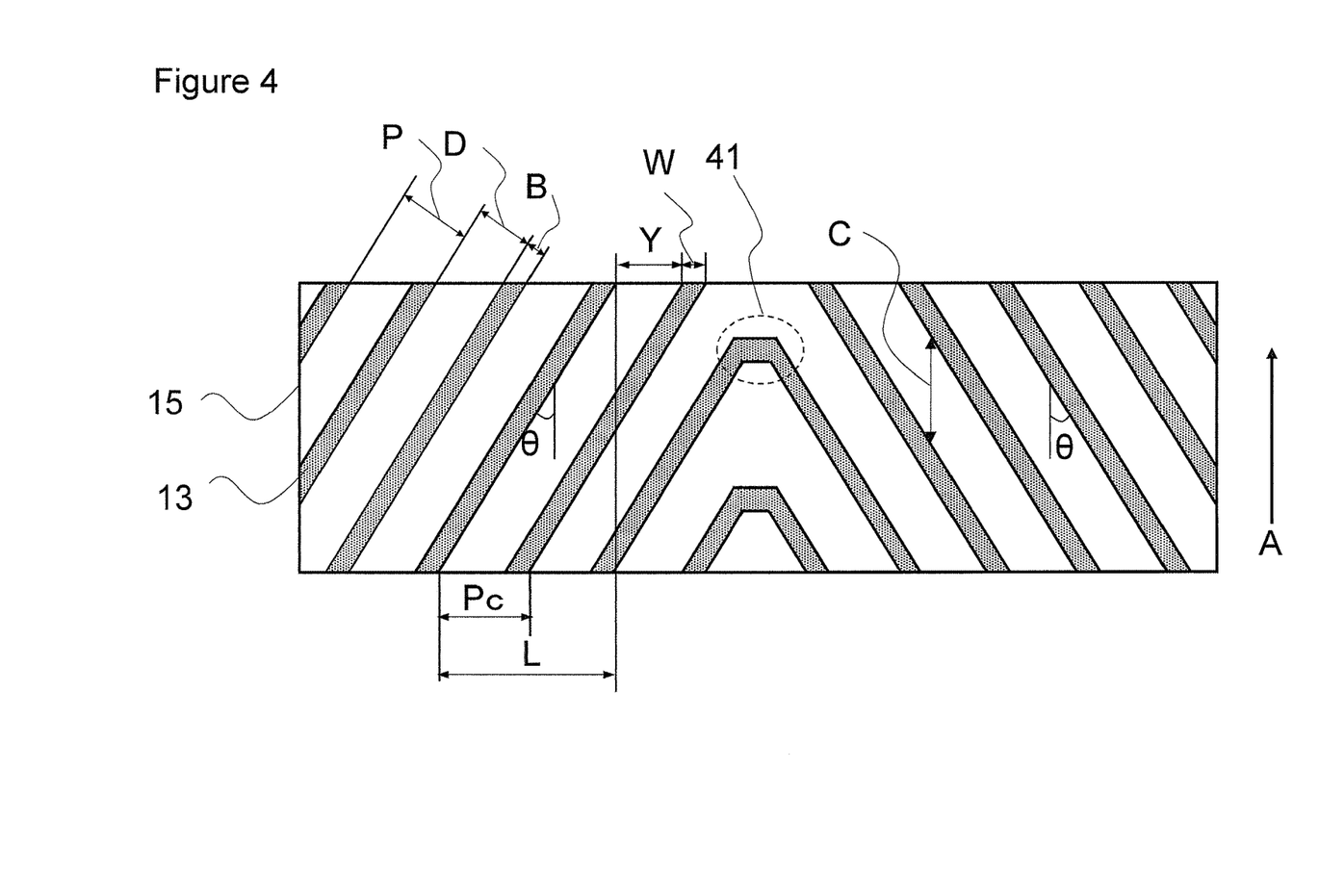
FIG. 4 gives a development view of the shapes of grooves in the surface of a sweeper roller.

In the present invention, furthermore, the width of a spiral groove measured in the axis direction of the sweeper roller is the size W of the groove measured in the roller axis direction shown in the development view of a sweeper roller surface in FIG. 4. The size W of a groove in the roller axis direction should be determined by taking measurements at least at five points and averaging them. In the case where a plurality of spiral grooves some or all of which differ in width exist in the surface of a sweeper roller, the expression "the width of the spiral grooves measured in the axis direction of the sweeper roller is 25 mm or more" means that at least one of the plurality of grooves has a size W of 25 mm or more in the roller axis direction.

In the present invention, furthermore, the separation between grooves in the surface of a sweeper roller measured in the rotation direction of the sweeper roller refers to the separation C between the grooves measured in the rotation direction A of the sweeper roller as shown in the development view of a sweeper roller surface in FIG. 4.

In the present invention, furthermore, the expression "a plurality of spiral grooves exist in the surface of a sweeper roller" means that two or more grooves that may have identical or different widths and shapes exist in a circumferential region of the sweeper roller, that is, two or more grooves are included in a radius-direction cross section of the sweeper roller or two or more grooves that are at different angles to the rotation direction of the sweeper roller exist in different regions in the axis direction of the sweeper roller. This applies, for example, to a case where two or more substantially parallel grooves having the same width and the same radius-direction groove shape are aligned at regular intervals over the entire region in the axis direction of the sweeper roller.

In the present invention, furthermore, the expression "a plurality of spiral grooves that do not cross each other" means that all of the spiral grooves are substantially in parallel over the surface of the sweeper roller and that each of them extends in an isolated manner from one end to the other. This means that any of the grooves is not branched or united with another and compared to this, it is regarded that two grooves cross each other not only in the case where they clearly intersect each other, but also in the case where two grooves extending at different angles to the rotation direction of the sweeper roller are united at ends as in portion 41 in FIG. 4 even if it seems that one groove is folded with a large angle to the rotation direction of the sweeper roller on the surface of the sweeper roller.

In the present invention, furthermore, the width of an ungrooved part measured in the axis direction of the sweeper roller is the distance Y between grooves measured in the roller axis direction as shown in the development view of a sweeper roller surface in FIG. 4.

In the present invention, furthermore, assuming that there are a plurality of spiral grooves in the surface of a sweeper roller, the number N of spiral grooves existing in the sweeper roller is defined as the number of grooves found in a radius-direction cross section of the sweeper roller. In the development view of a sweeper roller in FIG. 4, for example, the number N of grooves is the number of grooves found on a line drawn in parallel with the rotation direction A of the roller and the number N of grooves is two in the example given in FIG. 4.

In the present invention, furthermore, as shown in the development view of a sweeper roller surface given in FIG.

4, the pitch of spiral grooves measured in the axis direction is the distance between two grooves adjacent to each other in the axis direction of the roller, and in the case where grooves of the same shape are aligned at regular intervals, the pitch Pc of the spiral grooves measured in the axis direction of the spiral grooves is equal to the sum of the width W of each spiral groove in the axis direction of the sweeper roller and the width Y of each ungrooved part in the axis direction of the sweeper roller.

In the present invention, furthermore, as shown in the development view of a sweeper roller surface given in FIG. 4, the lead of a spiral groove is the distance L over which a groove proceeds in the axis direction as it goes around the circumference on the roller surface, and in the case where there are a plurality of spiral grooves aligned at regular intervals, the lead L of the spiral grooves is expressed as follows: the pitch Pc of the spiral grooves in the axis direction×the number N of the spiral grooves.

In the present invention, furthermore, the expression "there are a plurality of spiral grooves aligned at regular intervals" means that the roller is designed so that the machining pitch P is equal for any two adjacent ones of the plurality of grooves. The pitch P may vary slightly among them due to, for example, machining errors. Such machining errors depend on the accuracy of the processing machine and the level of skill of the processor, but commonly they are less than 15%.

The present invention serves to provide a sweeper roller that is free of the formation of air banks or sweeper marks during high-speed casting or thick film production and also provide a plastic film production method that uses the sweeper roller.

DETAILED DESCRIPTION OF EMBODIMENTS OF THE INVENTION

An example of the best mode for carrying out the invention is described below with reference to drawings, taking a plastic film production apparatus as an example.

Figure 3:
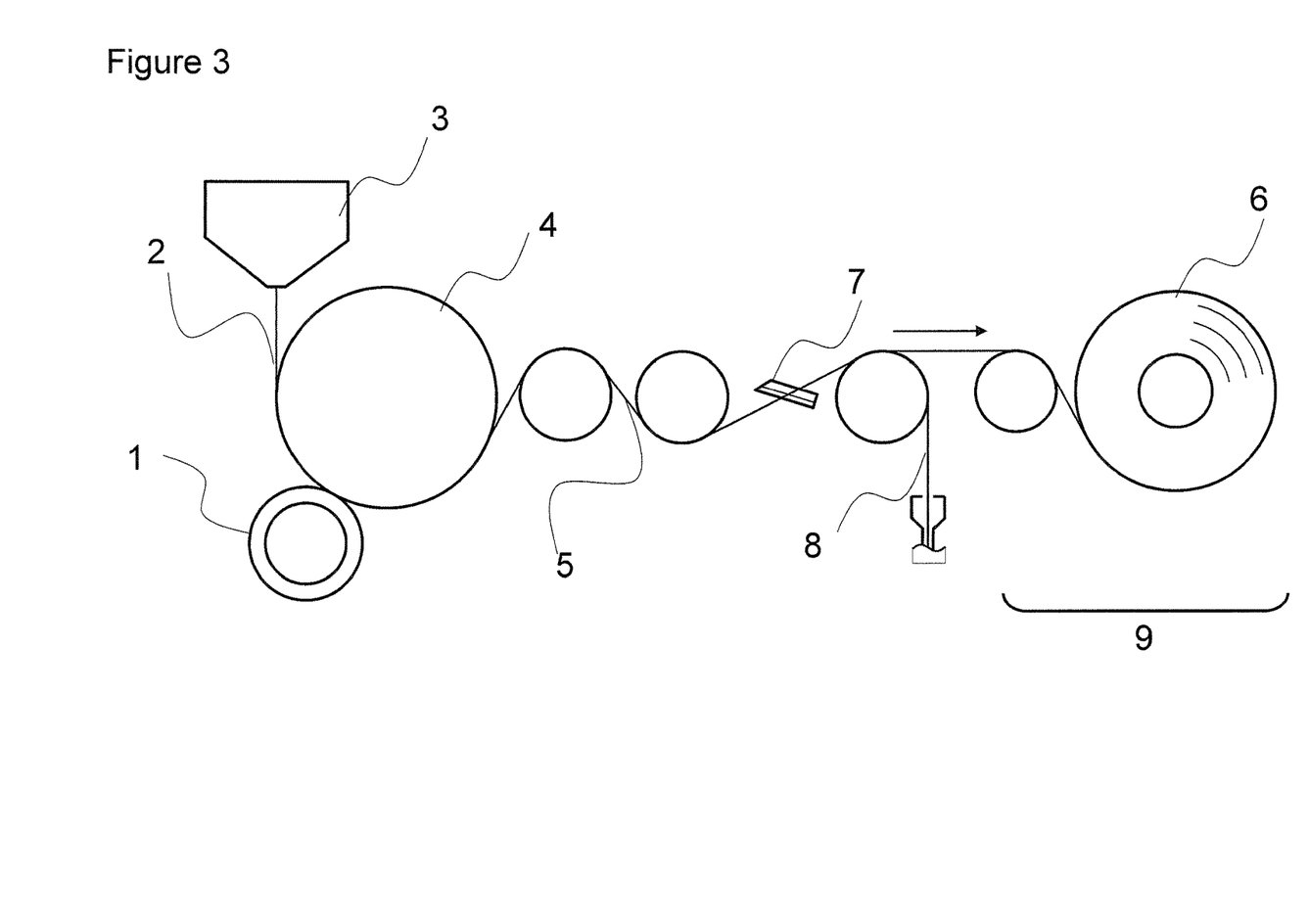
FIG. 3 gives a schematic side view of a film production apparatus for the film production method according to an embodiment of the present invention.

In the film production apparatus according to an embodiment of the present invention, a molten resin 2 is discharged from a T-die 3 and then cooled and solidified on a cooling roller 4 to form film 5 as shown in FIG. 3.

Subsequently, if necessary, the film is stretched in the length direction and/or in the width direction in a stretching step, cut or trimmed to remove the edges 8 in a slitting step, and wound up into a roll in a wind-up step 9 to provide a film roll 6. Then, the film may be subjected to another slitting step or other processing steps as required to provide a product roll.

The molten resin 2, supplied after being melt-kneaded in an extruder, which is not included in the figure, is discharged continuously from the T-die 3 through a slit, which is positioned in the direction perpendicular to the plane of the figure, so that the molten resin 2 is extruded into a sheet. It is preferable to provide a filtrating device, called polymer filter, between the extruder and the T-die 3, in order to prevent unmelted resin components, gel substances, or foreign objects from getting mixed. It is preferable for the slit in the T-die 3 to have an adjustable sift clearance to control the thickness variation in the width direction of the film 5. The thickness of the film to be produced can be controlled by changing the ratio between the discharging speed of the molten resin 2 and the rotating speed of the cooling roller 4. To produce a film 5 having a mufti-layered structure, a feedblock may be provided on the upstream side of the T-die 3 or a T-die 3 having a multi-manifold structure is used to perform co-extrusion to provide a multi-layered film.

There are no specific limitations on the molten resin 2 and depending on the uses of the film, useful resins include, for example, polyester, polypropylene, polyethylene, ethylene-methyl methacrylate copolymer, ethylene vinyl acetate copolymer, and fluorine resin, which may contain various additives or may be combined in the form of a laminate.

For example, the cooling roller 4 contains a flow channel in its interior so that a refrigerant can be distributed to control the surface temperature. The surface temperature of the cooling roller 4 is set appropriately in consideration of the type of the molten resin 2, the contact time between the molten resin 2 and the cooling roller 4, and the environmental temperature and humidity.

There are no specific limitations on the material to be used for the surface of the cooling roller 4 and useful ones include a metal, a ceramics, a resin, a composite film of a resin and a metal, and in addition, a film coated with a carbon material such as diamond-like carbon. An elastomer may also be used as a surface material for the cooling roller 4, but the cooling efficiency is likely to decrease due to its heat insulating properties and therefore, it is better to use a metal or a ceramics because they are higher in heat conductivity and rigidity. Preferred metals include iron, steel, stainless steel, chromium, and nickel. Preferred ceramics, on the other hand, include alumina, sintered silicon carbide, and sintered nitride silicon. To produce a cooling roller 4 with a metal surface, there are generally known useful surface treatment techniques including machining of metal members, electric plating, and electroless plating. To produce a ceramic surface, furthermore, there are generally known useful surface treatment techniques including machining of ceramic members, flame-spraying, and coating. For the cooling roller 4, a desired surface profile is developed by adopting an appropriate casting speed, film thickness, and temperatures of the molten resin 2 and cooling roller 4. For example, a mirror surface with an arithmetic average roughness Ra of 0.1 μm or less may be preferably adopted when producing thin film at a relatively low speed while a satin surface with an arithmetic average roughness Ra of 1.0 μm or more may be preferably adopted when producing thick film at a high speed. The cooling roller 4 serves mainly to cool and solidify the molten resin 2, but air can be caught up between the molten resin 2 and the cooling roller 4 and accordingly, sufficient cooling may not be achieved as a result of failing to maintain a required contact area. The layer of the air caught up becomes thicker with an increasing speed and therefore, the cooling performance deteriorates significantly as the casting speed increases. It is also clear that stronger cooling is necessary for solidification as the thickness of the molten resin (film) 2 on the cooling roller increases. If the cooling roller 4 has a satin surface, a required contact area can be maintained even when air is caught up to a certain degree and therefore, such a profile is preferred when the casting speed is more than 20 m/min. Preferred methods for bringing the molten resin (film) 2 into contact with the cooling roller 4 include the use of an apparatus called vacuum chamber to suck air from contact points between the molten resin 2 and the cooling roller 4, the use of an apparatus called air chamber to cause air pressure to press the molten resin (film) 2 against the cooling roller, and the electrostatic contact casting method that uses electrostatic force to press the molten resin 2 against the cooling roller 4.

The sweeper roller 1 comes in contact with the molten resin (film) 2 while the molten resin 2 is in contact with and is separated from the cooling roller 4, and the molten resin (film) 2 is pressed between the cooling roller 4 and the sweeper roller 1. There are no specific limitations on the apparatus to be used to press the sweeper roller 1 against the cooling roller 4, but it is preferable to adopt an air cylinder that uses air pressure because the pressure can be controlled easily. It is preferable that the position where the sweeper roller 1 is brought into contact with the molten resin (film) 2 can be set and adjusted appropriately in relation to the type and thickness of the film 5, the casting speed, the temperature of the cooling roller 4, and the like. By adjusting the distance between this contact position and the contact point between the molten resin 2 and the cooling roller 4, it is possible to prevent the surface profile of the cooling roller 4 or the sweeper roller 1 from being transferred to the molten resin (film) 2 or prevent the contaminants on the surface of the cooling roller 4 from failing to be transferred sufficiently to the molten resin (film) 2. While the pressing force of the sweeper roller 1 is set appropriately in consideration of the type and thickness of the molten resin (film) 2, a force in the range of 10 to 500 N/m is preferred. If the pressing force is in the above range, contaminants on the cooling roller 4 will be transferred easily to the molten resin (film) 2 while preventing flaws from being caused on the film due to an excessive pressing force.

Figure 1:
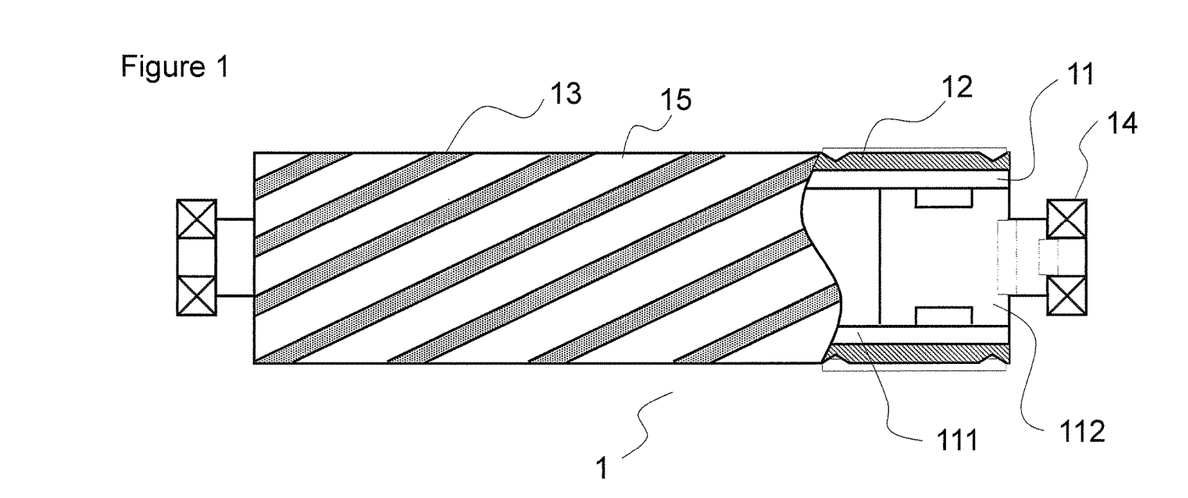
FIG. 1 gives a schematic front view according to an embodiment of the present invention.

As shown in FIG. 1, the sweeper roller 1 according to an embodiment of the present invention contains a shaft 11 covered circumferentially with rubber 12 and spiral grooves 13 are formed in the surface of the rubber 12.

Figure 2:
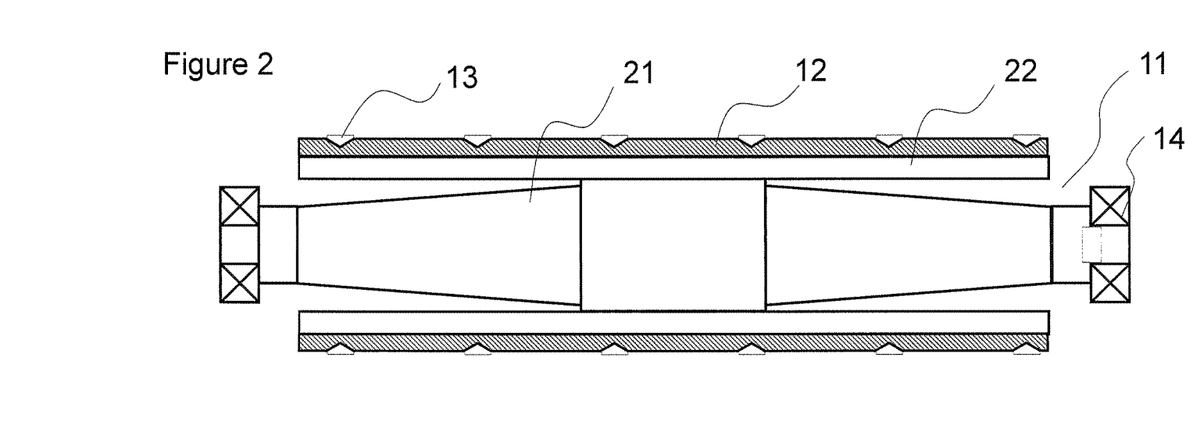
FIG. 2 gives a schematic cross section view according to another embodiment of the present invention.

In regard to its structure, the shaft 11 may be in the form of a simple hollow roller as in FIG. 1, in which a hollow tube 111 has a journal part 112 at an end so that it can be supported by a bearing 14. Or, the shaft 11 may have a flow channel in its interior to distribute a refrigerant for cooling. To ensure that a uniform pressure distribution relative to the cooling roller 4 is developed in the axis direction, as shown in FIG. 2, the shaft may have a double tube structure consisting of an inner tube 21 and an outer cylindrical member 22 that are concentric and connected only at the axis-direction center. A simple hollow roller can be produced at a small roller production cost, and if it contains a flow channel for cooling, the rubber 12 can be maintained below a required temperature limit even if the resin has to be handled at a high temperature because of its characteristics, serving to prevent thermal degradation of the rubber 12. If the shaft 11 has a double tube structure, the outer cylindrical member 22 and the cooling roller 4 will bend in the same direction and the molten resin (film) 2 can be pressed uniformly in the axis direction of the roller, serving to prevent sweeper marks from being formed and grown as a result of excessive local stresses caused by uneven pressure. The shaft 11 may be of a material selected appropriately from a variety of general machine structural materials and preferable ones include, for example, steel, stainless steel, aluminum, and fiber reinforced resin.

There are no specific limitations on the material of the rubber 12 and useful materials include, for example, natural rubber, nitrile rubber, chloroprene rubber, ethylene propylene rubber, silicone rubber, chlorosulfonated polyethylene, urethane rubber, fluorine rubber, and mixtures thereof, which may contain a filler or other various additives. From these, a suitable one is selected to meet the use environment and resin characteristics. For example, rubbers composed mainly of silicone rubber, which is high in releasability and heat resistance, are preferred in the case where the molten resin (film) 2 has adhesiveness or a high temperature, while ethylene propylene rubber and the like that are high in ozone resistance are preferred in the case where an ozone generating source such as a static electricity generation apparatus exists in the vicinity.

There are no specific limitations on the rubber hardness of the rubber 12 and it may be an appropriate value suitable to meet the performance requirements in the Hs range of 30 to 90 JIS-A (JIS K 6301 (1995)) where production of common rubbers is possible. If, for example, the film is liable to generate sweeper marks or has a large width, rubbers with a low Hs hardness (30 to 60 JIS-A) are preferred because pressure distribution is an important matter in such cases, while rubbers with a high Hs hardness (60 to 90 JIS-A) are preferred if the film has a small width or the durability of the rubber 12 is an important matter. Sponge-like rubber is preferred when rubber with a still lower Hs hardness (30 JIS-A or less) is required from the viewpoint of pressure distribution.

To cover the shaft 11 with rubber 12, a variety of methods are available and a suitable one can be selected therefrom. For example, an adhesive is applied to the surface of the shaft 11, followed by enclosing it with an unvulcanized rubber sheet and vulcanizing/molding it by applying heat and pressure, or the shaft 11 is fitted into rubber 12, which is vulcanized and molded in advance in a tube-like shape, followed by bonding them together.

The surface of the rubber 12 has spiral grooves 13. The proportion of the area of the grooves 13 to the surface area of the sweeper roller (hereinafter referred to as aperture ratio) is 30% or less and the grooves 13 in the surface of the sweeper roller have a width W of 25 mm or more in the axis direction of the sweeper roller. If the aperture ratio and the groove width W in the axis direction of the sweeper roller are in the above ranges, the formation of sweeper marks and air banks can be prevented during high speed casting and thick film production.

As described above, sweeper marks are defects caused by the transfer of groove patterns on the surface of the sweeper roller 1 to the product film 5. Based on detailed analysis, the inventors found that there are two types of sweeper marks. Some of them are formed when contaminants existing on the cooling roller 4 are transferred to the film 5 in the parts free of grooves 13 (ungrooved parts 15) in the surface of the sweeper roller 1, while the transfer of contaminants does not occur in the grooved parts 13, resulting in unevenness of light and shade due to the presence or the absence of contaminants. The others are flaws resulting from the transfer of the surface profiles of the cooling roller 4 or the sweeper roller caused by the pressure at the contact parts.

Considering the features of the two types of sweeper marks and factors in their formation, it is easily thought of that decreasing the aperture ratio must be effective as a method of reducing sweeper marks. Specifically, the quantity of contaminants transferred per unit area decreases, resulting in decreased unevenness of light and shade due to the presence or the absence of contaminants, with an increasing area containing contaminants that are transferred to the film 5 during one revolution of the sweeper roller 1. Furthermore, as the aperture ratio decreases, the contact area increases and accordingly the pressure in the contact part 15 decreases, leading to reduction of flaws. However, as described later, air banks 52 are formed in a conventional sweeper roller when the aperture ratio is small and this technical tradeoff has hindered the improvement. If air banks 52 are formed, the molten resin (film) 2 will not be cooled sufficiently, leading to a further increase of sweeper marks.

Figure 5:
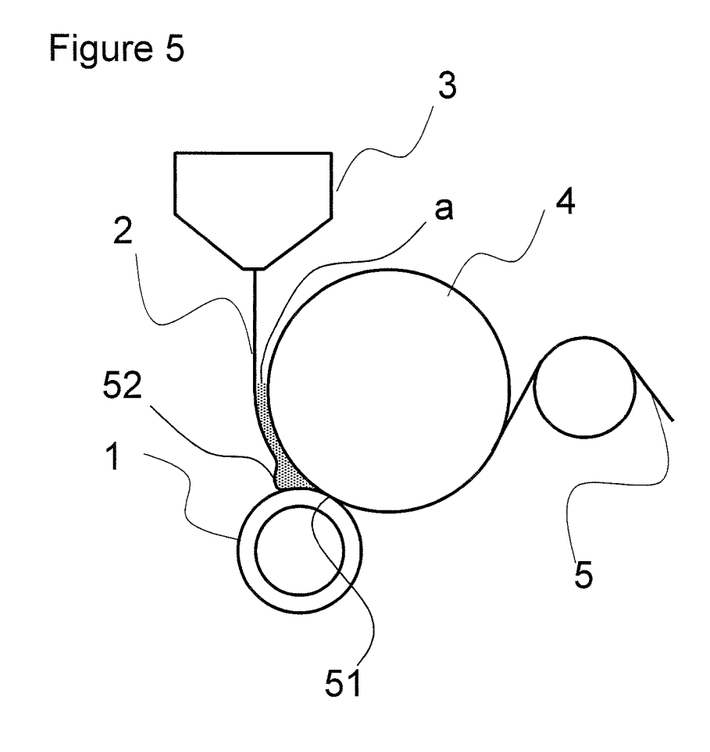
FIG. 5 gives a schematic side view of a casting step for the film production method.
Figure 6:
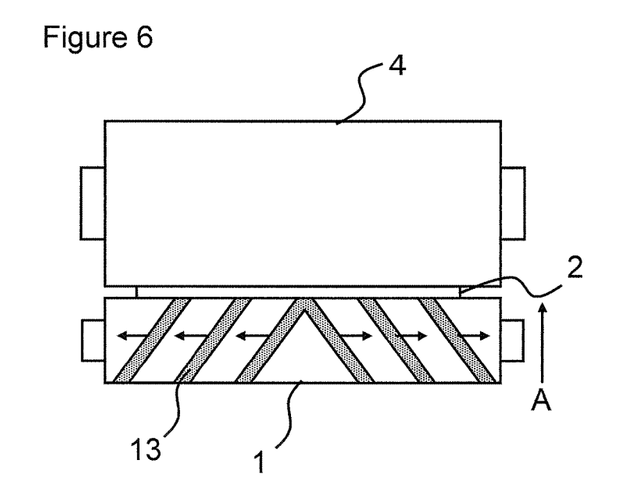
FIG. 6 gives a schematic plan view showing the conventional concept of air discharge from a film pressing part.

As seen from FIG. 5, as the molten resin 2 comes in contact with the cooling roller 4, the air a caught between the molten resin 2 and the cooling roller 4 is prevented from moving forward at the contact point 51 between the sweeper roller 1 and the cooling roller 4, thereby forming air banks 52. Thus, the grooves 13 are provided in the surface of the sweeper roller 1 to impede their generation. The air banks 52 often cause problems such as uneven cooling, creasing, and breakage of the molten resin (film) 2. To prevent the generation of air banks 52, the air a has to be removed from between the molten resin (film) 2 and the cooling roller 4. The mechanism, the concept of which is roughly illustrated in FIG. 6, for the sweeper roller to remove the air a at the contact point between the sweeper roller and the molten resin (film) 2, has been thought to be that the spiral grooves 13 which extend from the central region to the ends in the axis direction move continuously toward the ends as the sweeper roller 1 rotates, thereby allowing the air a caught in the grooved parts to be discharged from the lateral edges of the molten resin (film) 2. This is clearly seen from the fact that the conventional sweeper rollers have spiral grooves that are symmetrical about the axis-direction center. To prevent the generation of the air banks 52, therefore, the total area of the grooves or the aperture ratio has to be increased for efficient removal of the air a toward the ends, which inevitably leads to an increase of sweeper marks, resulting in technical tradeoff. In particular, the layer thickness of the air a increases with an increasing speed of the cooling roller 4 and therefore, the aperture ratio has to be further increased in the case of a high-speed casting step such as for unstretched film production, leading to an increase of sweeper marks.

Figure 7:
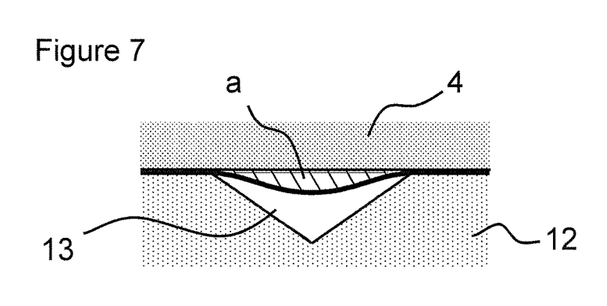
FIG. 7 gives a schematic cross section view showing the mechanism of air discharge through grooves.

To solve this problem, the inventors carried out some experiments and found that the quantity of the air a discharged through the mechanism described above is not large relative to the entire quantity of discharged air and that actually, as illustrated in FIG. 7, the molten resin (film) 2 is lifted in the part where the sweeper roller 1 and the molten resin (film) 2 are not in contact with each other by the groove 13 to allow the air a to pass, which should be the main mechanism. The volume V of air discharge per groove caused by the lifting of the molten resin (film) 2 is associated with the hatched area in FIG. 7, and this hatched area is considered to be approximated by the deflection of a beam that is subjected to the differential pressure between the pressure of the air a and the atmospheric pressure and the uniformly distributed load p by the centrifugal force due to the mass of the molten resin (film), as represented by formula 1. Here, w, E, and I respectively represent the deflection, modulus of longitudinal elasticity, and geometrical moment of inertia of the molten resin (film) 2. This suggests that the discharge rate of the air a is proportional to the fifth power of the width W of the groove 13 (hereinafter simply referred to as groove width W) in the axis direction of the roller.

$$V = \int_0^W w\,dx = \frac{31pW^5}{720EI} \qquad \text{[Formula 1]}$$

Compared to this, the aperture ratio is considered to be proportional to the discharge volume of the air a, and accordingly the present inventors found that the generation of the air banks 52 can be depressed by increasing the groove width W even if the aperture ratio is decreased to reduce sweeper marks.

Figure 8:
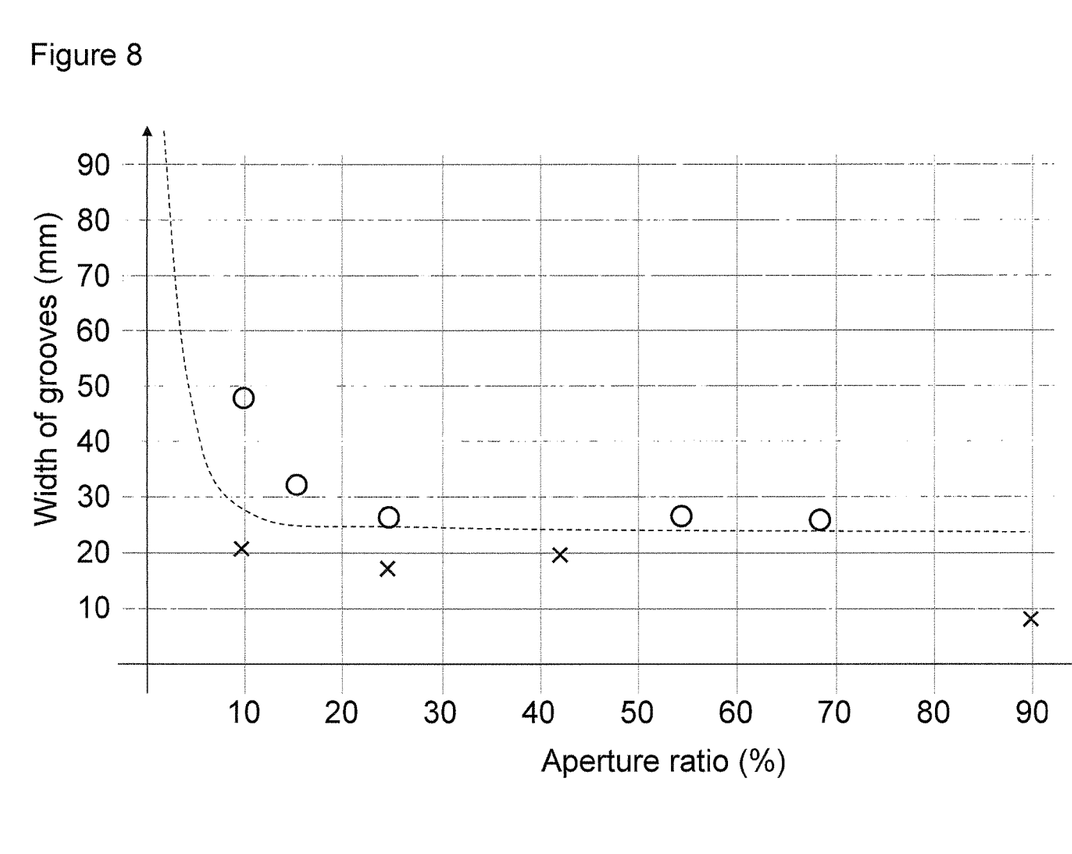
FIG. 8 gives a graph showing the relation among the aperture ratio, width of grooves, and generation of air banks.

FIG. 8 shows experimental results showing whether the air banks are formed at different groove widths and aperture ratios. ○ represents the absence of an air bank while x represents the existence of air banks. The results fluctuate depending on conditions, but significant fluctuations are not expected to occur because the groove width W is generally the dominant factor in the air discharge volume. Thus, an aperture ratio of 30% or less can be achieved without the generation of air banks if the groove width W is 25 mm or more. The air discharging effect will not be influenced adversely even if the groove width W is larger than 100 mm, however, this will make the processing of the groove 13 difficult and lead to an increase in processing cost and furthermore, it will be difficult to decrease the aperture ratio to 30% or less, suggesting that the groove width W is preferably 100 mm or less.

Sweeper marks can be reduced more effectively as the aperture ratio decreases as described above, while such a quality as the sweeper marks are substantially undetectable by visual observation could be achieved if it is 30% or less. And if it is 20% or less, good effect can be ensured even in the case of production conditions and resins that are liable to sweeper marks, so the aperture ratio is more preferably 20% or less. Furthermore, an aperture ratio of 10% or more is preferable because the generation of air banks can be prevented over a wider range of conditions as suggested by formula 1.

In addition, another method to reduce sweeper marks associated with unevenness of light and shade due to dirt is to allow the contaminants on the surface of the cooling roller 4 to be transferred efficiently and uniformly to the molten resin (film) 2. As described above, contaminants on the surface of the cooling roller 4 are transferred continuously to the molten resin (film) 2 under the pressure applied by the sweeper roller 1 whereas such transfer does not occur in the parts corresponding to the grooves 13. To allow the entire surface of the cooling roller 4 to be cleaned uniformly, therefore, it is preferable that the outside diameters of the cooling roller 4 and sweeper roller 1 and the specifications of the grooves be set up so that those parts of the surface of the cooling roller 4 which face a groove 13 at a time will face an ungrooved part 15 after one revolution of the cooling roller 4. If the ratio between the circumference of the cooling roller and that of the sweeper roller is substantially an integer, for example, those parts of the surface of the cooling roller 4 which face a groove 13 do not move significantly even though the cooling roller 4 rotates, so the contaminants on the cooling roller 4 tend to be accumulated instead of being transferred to the molten resin (film) 2, possibly leading to deterioration of sweeper marks. Equation (1)

expresses the distance M through which the grooves 13 provided in the surface of the sweeper roller 1 move in the axis direction relative to the cooling roller 4 as the cooling roller 4 makes one revolution. It is preferable that this moving distance M of the grooves 13 in the axis direction be not less than the width W of the grooves and not more than the axis-direction width Y of the ungrooved parts 15, because in that case, with the aperture ratio in the above-mentioned range, the entire surface of the cooling roller 4 can come in contact with ungrooved parts 15 on the sweeper roller 1 as the cooling roller 4 makes two revolutions, allowing the contaminants on the surface of the cooling roller 4 to be transferred efficiently and uniformly to the molten resin (film) 2.

$$M=\{(Dc \times N) \bmod Ds\}/Ds \times Pc \qquad \text{equation (1)}$$

Here, M represents the moving distance of the grooves in the axis direction during one revolution of the cooling roller 4, Dc the outside diameter of the cooling roller 4, Ds the outside diameter of the sweeper roller 1, N the number of spiral grooves 13 provided in the sweeper roller 1, Pc the pitch of the spiral grooves 13 in the axis direction (=L/N), and L the lead of the spiral grooves 13.

If the grooves 13 are not aligned in the same direction as the axis of the roller (90° to the rotation direction of the roller), the ungrooved parts 15 can continuously maintain contact, serving to prevent vibrations of the sweeper roller 1. If the grooves 13 are at an angle θ of 40° or more to the rotation direction of the sweeper roller, the groove width W in the axis direction of the sweeper roller increases relative to the machining width B of the grooves shown in FIG. 4 based on the relation of B/cos θ, making it easy to realize an aperture ratio of 30% or less while allowing the grooves to have a groove width W of 25 mm or more. The angle θ of the spiral grooves 13 to the rotation direction of the sweeper roller may be either positive or negative with respect to the counterclockwise direction as shown in FIG. 4.

On the surface of the sweeper roller, the separation C between the spiral groove 13 measured in the rotation direction of the sweeper roller (hereinafter simply referred to as groove separation C) is preferably 100 mm or less. If the groove separation C between spiral grooves 13 is 100 mm or less, the air a caught up between the molten resin (film) 2 and the cooling roller 4 will not be arrested for a long period of time by ungrooved parts 15. Accordingly, even if the width of the ungrooved parts 15 is increased to allow the aperture ratio to be 30% or less, the generation of local air banks at this position are prevented almost completely and uneven cooling of the molten resin (film) 2 is depressed, thus facilitating the production of highly planar film. The groove separation C has the relation of D/sin θ to the width D of the ungrooved parts 15 and accordingly, a groove separation C of 100 mm or less can be realized easily if the angle θ of the grooves 13 to the rotation direction of the sweeper roller is 40° or more. Here, cooling can be performed more uniformly as the groove separation C between the spiral grooves 13 is decreased. However, this requires a larger number of grooves 13 and accordingly, it is preferable for C to be in the range of 10 mm or more and 100 mm or less.

To allow the aperture ratio and groove width to be in the above range, a plurality of spiral grooves 13 are necessary in many cases, particularly when, for example, a sweeper roller with a large diameter Is used. Furthermore, the plurality of spiral grooves 13 may be provided symmetrically about the axis-direction center as in the conventional sweeper rollers, causing the crossing of grooves in some parts, but it is preferable for any of the spiral groove 13 not to cross another. If there is no crossing between spiral grooves 13, there will be no such parts as the part 41 in FIG. 4 where crossings of grooves form the starting points of ungrooved parts. Thus, this serves easily to prevent the starting points of ungrooved parts from causing vibrations with a period equal to the rotation period of the sweeper roller or the rotation period divided by the number of grooves and also serves often to allow the spiral grooves 13 to be machined easily and at low cost. In the mechanism in which the air a caught up between the molten resin (film) 2 and the cooling roller 4 is discharged by spiral grooves, the spiral grooves do not play a major role to discharge air by moving it from the central region to the edges. If the groove width W measured in the axis direction of the sweeper roller is 25 mm or more, therefore, it will not be necessary to provide crossings of spiral grooves in order to extend the spiral grooves 13 from the central region to the edges.

EXAMPLES

The present invention will now be illustrated with reference to Examples, but it should be understood that the invention is not construed as being limited thereto. The methods used for measurement and evaluation for various physical properties are as described below.
(1) Air Banks
The film production is observed visually to check whether the air banks are generated or not.
(2) Sweeper Marks
The film produced is observed visually and ranked as AA if no sweeper marks are visible, A if sweeper marks are almost invisible, B if sweeper marks are visible, and C if sweeper marks are visible from a distance.

Examples 1 to 4

Using a plastic film production apparatus as shown in FIG. 3, a polypropylene is discharged in a homopolymer monolayer flow from a T-die 3 through a slit having a width adjusted to 0.9 mm, and cooled for solidification on a cooling roller 4 with an outside diameter of 900 mm rotating at a speed of 50 m/min to produce a polypropylene film with a thickness of 100 μm, which is wound up by a winder to provide a film roll 6. The sweeper roller 1 had a structure as illustrated in FIG. 1, contained a shaft 11 of carbon steel covered with a silicone rubber, and had an outside diameter of 220 mm. Table 1 summarizes the specifications and aperture ratio of the grooves formed in the surface of the sweeper roller and the distance M through which the grooves move in the axis direction as the cooling roller 4 makes one revolution.

Example 5

Except that the film production speed was 100 m/min, film production was performed using the same apparatus and conditions as in Example 1 to provide a polypropylene film.

Comparative Examples 1 to 3

Except that a conventional sweeper roller was used as the sweeper roller 1, film production was performed using the same apparatus and conditions as in Examples to provide polypropylene films. Table 2 summarizes the specifications and aperture ratio of the grooves formed in the surface of the sweeper roller and the distance M through which the grooves move in the axis direction as the cooling roller 4 makes one revolution.

Comparative Example 4

Except that the film production speed was 20 m/min, film production was performed using the same apparatus and conditions as in Comparative example 2 to provide a polypropylene film.

Results of film production in Examples and Comparative examples given above are shown in the bottom of Tables 1 and 2.

In Comparative example 1, the aperture ratio was large, but the groove width W was small, resulting in the generation of air banks, deterioration of sweeper marks, and markedly poor appearance quality. In Comparative example 2 as well, the groove width W was small, resulting in the generation of air banks. In Comparative example 3, furthermore, the grooves had a large axis-direction width W of 26.7 mm, but the aperture ratio was also as large as 42%, resulting in the deterioration of sweeper marks. In Comparative example 4, the film production speed was decreased, serving for eliminating the generation of air banks and reduction of sweeper marks to an acceptable level, but the productivity decreased remarkably.

TABLE 1

|  |  | Example 1 | Example 2 | Example 3 | Example 4 | Example 5 |
|---|---|---|---|---|---|---|
| Aperture ratio | % | 25 | 20 | 20 | 25 | 25 |
| Width of grooves W | mm | 30.7 | 28.8 | 28.8 | 55.9 | 30.7 |
| Groove separation C | mm | 129.6 | 92.2 | 92.2 | 30.5 | 129.6 |
| Lead angle θ | deg | 35 | 51 | 51 | 80 | 35 |
| Crossing of grooves |  | existent | existent | absent | Absent | existent |
| Moving distance of grooves M | mm | 29.7 | 30.6 | 30.6 | 3.9 | 29.7 |
| Number of grooves |  | 4 | 6 | 6 | 17 | 4 |
| Width of ungrooved part Y | mm | 92.0 | 115.4 | 115.4 | 167.7 | 92.0 |
| Axis-direction pitch Pc | mm | 81.6 | 56.2 | 56.2 | 7.2 | 81.6 |
| Machining width of grooves B | mm | 25 | 18 | 18 | 10 | 25 |
| Air banks | mm | absent | absent | absent | Absent | absent |
| Sweeper marks |  | A | AA | AA | A | A |

TABLE 2

|  |  | Comparative example 1 | Comparative example 2 | Comparative example 3 | Comparative example 4 |
|---|---|---|---|---|---|
| Aperture ratio | % | 40 | 25 | 42 | 25 |
| Width of grooves W | mm | 15.4 | 22.6 | 26.7 | 22.6 |
| Groove separation C | mm | 103.7 | 129.6 | 10.8 | 129.6 |
| Lead angle θ | deg | 13 | 28 | 20 | 28 |
| Crossing of grooves |  | existent | existent | existent | existent |
| Moving distance of grooves M | mm | 13.3 | 25.8 | 20.3 | 25.8 |
| Number of grooves |  | 4 | 4 | 4 | 4 |
| Width of ungrooved parts Y | mm | 23.0 | 67.7 | 36.8 | 67.7 |
| Axis-direction pitch Pc | mm | 36.6 | 70.9 | 55.9 | 70.9 |
| Machining width of grooves B | mm | 15 | 20 | 25 | 20 |
| Air banks | mm | existent | existent | absent | absent |
| Sweeper marks |  | C | C | B | A |

In Examples 1 to 4, the generation of sweeper marks is prevented without generating air banks. In Examples 2 and 3, in particular, the separation C between the spiral grooves measured in the rotation direction of the sweeper roller was adjusted to 92.2 mm, resulting in film with high planarity and appearance quality. The formation of spiral grooves at an angle of 51° to the rotation direction of the sweeper roller allows the aperture ratio to be 20% while maintaining a groove width W of 28.8 mm in the axis direction of the sweeper roller. Furthermore, the moving distance M of the grooves in the axis direction during one revolution of the cooling roller is set to not less than the groove width W and not more than the width Y of the ungrooved parts, serving for completely eliminating visibly detectable sweeper marks while preventing the generation of air banks. In Example 3, furthermore, there are no crossings among the grooves, serving for completely eliminating vibrations and reducing the processing costs. In Example 5, the formation of significant sweeper marks was depressed while preventing the generation of air banks although the film production speed was doubled to 100 m/min.

The present invention provides a sweeper roller that can work in a plastic film production process, particularly for the production of unstretched film, although its application is not limited thereto.

EXPLANATION OF NUMERALS 1. sweeper roller
2. molten resin or cooled/solidified film
3. T-die
4. cooling roller
5. film
6. film roll
7. edge-slitting blade
8. film edge
9. wind-up step
11. shaft
111. hollow tube
112. journal
12. rubber 13. groove
14. bearing
15. ungrooved part
21. inner tube
22. outer cylindrical member
41. crossing of grooves (staring point of ungrooved part)
51. contact point of sweeper roller
52. air bank
θ: lead angle of grooves
A: rotation direction of the sweeper roller
B: machining width of grooves
C: groove separation in the rotation direction of the roller
D: width of ungrooved parts
W: width of grooves in the axis direction of the roller
Y: width of ungrooved parts in the axis direction of the roller
P: machining pitch of grooves
Pc: pitch of grooves in the axis direction of the roller
L: lead of grooves in the axis direction of the roller

The invention claimed is:

1. A sweeper roller for film production having spirally grooved surface comprising a plurality of spiral grooves, wherein the proportion of a surface area of the plurality of spiral grooves to a surface area of the sweeper roller is 30% or less, and the width of each of the plurality of spiral grooves measured in the axis direction of the sweeper roller is 25 mm or more.

2. A sweeper roller for film production as described in claim 1, wherein the spiral grooves are separated on the surface of the sweeper roller at intervals of 100 mm or less in a rotation direction of the sweeper roller.

3. A sweeper roller for film production as described claim 1, wherein the spiral grooves make an angle of 40° or more and less than 90° to a rotation direction of the sweeper roller.

4. A sweeper roller for film production as described in claim 1 wherein the plurality of spiral grooves exist in the surface of the sweeper roller with no crossings among the spiral grooves.

5. A plastic film production apparatus comprising a T-die, a cooling roller, and the sweeper roller for film production as described in claim 1,
    wherein the T-die is positioned for discharging a molten resin on the cooling roller to form a molten resin film, and
    wherein the sweeper roller is positioned to come in contact with the molten resin while the molten resin is in contact with and is separated from the cooling roller.

* * * * *